US008959497B1

(12) United States Patent
Stratton et al.

(10) Patent No.: US 8,959,497 B1
(45) Date of Patent: Feb. 17, 2015

(54) SYSTEM AND METHOD FOR DYNAMICALLY SPAWNING THREAD BLOCKS WITHIN MULTI-THREADED PROCESSING SYSTEMS

(75) Inventors: John A. Stratton, Champaign, IL (US); David Luebke, Charlottesville, VA (US)

(73) Assignee: NVIDIA Corporation, Santa Clara, CA (US)

( * ) Notice: Subject to any disclaimer, the term of this patent is extended or adjusted under 35 U.S.C. 154(b) by 1849 days.

(21) Appl. No.: 12/202,156

(22) Filed: Aug. 29, 2008

(51) Int. Cl.
*G06F 9/45* (2006.01)

(52) U.S. Cl.
USPC ............................ 717/149; 717/140; 717/161

(58) Field of Classification Search
USPC ................... 717/140, 149, 161; 718/107, 100
See application file for complete search history.

(56) References Cited

U.S. PATENT DOCUMENTS

| | | | |
|---|---|---|---|
| 5,297,217 A | | 3/1994 | Hamilton, Jr. et al. |
| 5,724,565 A * | | 3/1998 | Dubey et al. .................. 712/245 |
| 5,990,852 A * | | 11/1999 | Szamrej ......................... 345/2.1 |
| 6,374,403 B1 * | | 4/2002 | Darte et al. .................... 717/161 |
| 6,507,947 B1 * | | 1/2003 | Schreiber et al. ............. 717/160 |
| 6,728,722 B1 * | | 4/2004 | Shaylor .................................. 1/1 |
| 6,931,390 B1 * | | 8/2005 | Zait et al. .............................. 1/1 |
| 7,373,640 B1 * | | 5/2008 | English et al. ................ 717/149 |
| 7,414,623 B2 | | 8/2008 | Whitted et al. |
| 7,467,385 B2 * | | 12/2008 | Nemirovsky et al. ......... 718/107 |
| 2001/0016901 A1 * | | 8/2001 | Topham ........................ 712/217 |
| 2005/0055541 A1 * | | 3/2005 | Aamodt et al. ............... 712/217 |
| 2005/0071438 A1 * | | 3/2005 | Liao et al. ..................... 709/214 |
| 2005/0071841 A1 * | | 3/2005 | Hoflehner et al. ............ 718/100 |
| 2007/0074195 A1 * | | 3/2007 | Liao et al. ..................... 717/160 |
| 2007/0130568 A1 * | | 6/2007 | Jung et al. ..................... 718/104 |
| 2007/0156729 A1 | | 7/2007 | Shaylor |
| 2008/0209407 A1 * | | 8/2008 | Okabayashi et al. ......... 717/146 |

FOREIGN PATENT DOCUMENTS

| WO | WO 2008/127610 | 10/2008 |
|---|---|---|
| WO | WO 2008/127622 | 10/2008 |
| WO | WO 2008/127623 | 10/2008 |

OTHER PUBLICATIONS

Lee et al. "Adaptively Icnreasing Performance and Scalability of Automatically Parallelized Programs", Springer-Verlag, 2005.*
Moss, et al. "Toward Acceleration of RSA Using 3D Graphics Hardware," LNCS 4887, Dec. 2007, pp. 369-388.
Office Action in U.S. Appl. No. 12/202,157 mailed Jan. 6, 2012.
Non-Final Office Action dated Jun. 27, 2012 for U.S. Appl. No. 12/202,157.

(Continued)

*Primary Examiner* — Li B Zhen
*Assistant Examiner* — Viva Miller
(74) *Attorney, Agent, or Firm* — Patterson & Sheridan LLP

(57) ABSTRACT

One embodiment of the present invention sets forth a technique for partitioning a predecessor thread program into sub-programs and dynamically spawning a thread grid of the sub-programs based on the outcome of a conditional statement in the predecessor thread program. The programming instructions for the predecessor thread program are analyzed to assess the benefit of partitioning the thread program at a conditional statement into sub-programs. If the predecessor thread program is partitioned, then each branch of the conditional statement may be used to form a separate sub-program. Predicate tables are populated at the predecessor thread program run-time to establish which possible instances of the thread sub-programs should be spawned in subsequent execution phases.

19 Claims, 14 Drawing Sheets

(56) References Cited

OTHER PUBLICATIONS

Non-Final Office Action dated Oct. 27, 2011 for U.S. Appl. No. 11/960,652.

Final Office Action dated Apr. 25, 2012 for U.S. Appl. No. 11/960,652.

Notice of Allowance & Applicant-Initiated Summary dated Jul. 20, 2012 for U.S. Appl. No. 11/960,652.

* cited by examiner

| 1 1132-1 | 1 1132-2 | 0 1132-3 | 1 1132-4 |
|---|---|---|---|
| 1 1132-5 | 0 1132-6 | 0 1132-7 | 0 1132-8 |
| 0 1132-9 | 0 1132-10 | 0 1132-11 | 0 1132-12 |
| 0 1132-13 | 0 1132-14 | 0 1132-15 | 0 1132-16 |

| 0 1134-1 | 0 1134-2 | 1 1134-3 | 0 1134-4 |
|---|---|---|---|
| 0 1134-5 | 1 1134-6 | 1 1134-7 | 1 1134-8 |
| 0 1134-9 | 0 1134-10 | 0 1134-11 | 0 1134-12 |
| 0 1134-13 | 0 1134-14 | 0 1134-15 | 0 1134-16 |

SYSTEM AND METHOD FOR DYNAMICALLY SPAWNING THREAD BLOCKS WITHIN MULTI-THREADED PROCESSING SYSTEMS

BACKGROUND OF THE INVENTION

1. Field of the Invention

Embodiments of the present invention relate generally to parallel processing and more specifically to a system and method for dynamically spawning thread blocks within multi-threaded processing systems.

2. Description of the Related Art

Modern multi-processor systems, such as single-instruction multiple-data (SIMD) systems found in graphics processing units (GPUs), typically implement a relatively general programming model. The programming model conventionally includes a means for defining the specific programming instructions for a thread along with any system resources needed by the thread. One or more instances of the thread may execute concurrently in a thread block, where each thread may be allocated a portion of the overall workload through the use of a thread index. After the threads in a given thread block have completed execution, a process management subsystem is alerted and any further processing steps may be initiated by the process management subsystem. In some systems, the process management subsystem is part of a device driver. For example, after a first thread block has completed a first set of computations, the driver may be alerted to the completion of the first set of computations. The driver may subsequently spawn a second thread block to perform a second stage of computation that is based on the first set of computations.

Programming models for multi-processor, multi-threaded systems, such as SIMD GPU systems, commonly permit the use of general programming constructs, including conditional operators. A conditional operator guides the execution of a given thread at run-time to follow one out of two or more different paths through the programming instructions of the thread. Each path may include unique system resource requirements, such as a specific memory or register allocation. Conditional statements within the programming instructions of the thread are often computed dynamically, forcing the compiler to allocate sufficient system resources at compile time to satisfy the most expensive possible dynamic execution path within the thread. As a result, when a thread block is spawned, each thread within the thread block needs to be allocated sufficient resources for the most expensive possible execution path within the thread.

Certain common multi-threaded algorithms are characterized as having dramatically different system resource requirements for one conditional execution path compared to another conditional execution path. For example, iterative convergence algorithms may require substantial system resources to perform a large or complex iteration computation for non-converged regions, whereas negligible system resources are required for regions that have previously converged and require no further computation. An iterative convergence algorithm typically allocates specific regions of the problem space to specific threads within the multi-threaded system. A conditional statement within a given thread guides the execution of the thread to either perform the iteration computation if the thread is responsible for a non-converged region or to return if the thread is responsible for a converged region. The iteration computation may require substantial system resource, whereas the return path requires almost none. At run-time, however, every thread within the associated thread block needs to be spawned with sufficient system resources to perform the full iteration computation, leading to an inherent inefficiency in resource utilization.

Iterative convergence algorithms frequently converge much of the overall problem space quickly and tend to spend many iteration cycles attempting to converge small regions. This leads to a common scenario where much of the potential computational resources of a multi-processor system are actually allocated to threads that are not performing any useful work.

As the foregoing illustrates, what is needed in the art is a technique for more efficiently utilizing resources within a multi-threaded processing system.

SUMMARY OF THE INVENTION

One embodiment of the present invention sets forth a method for compiling a thread program to support dynamic thread spawning. The method includes the steps of compiling a portion of a first thread program, identifying a conditional statement within the portion of the first thread program, partitioning the portion of the first thread program following the conditional statement into a code block, instantiating a first predicate table for the code block to indicate which thread blocks in the thread grid are to execute the code block, and generating a second thread program based on the code block.

One advantage of the disclosed method is that greater computational efficiency is achieved by spawning only blocks of threads that perform useful work.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 11B illustrates a predicate table for a second thread program, where certain entries are set to enabled, according to one embodiment of the invention;

FIG. 11C illustrates a predicate table for a third thread program, where a different set of entries are set to enabled, according to one embodiment of the invention.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
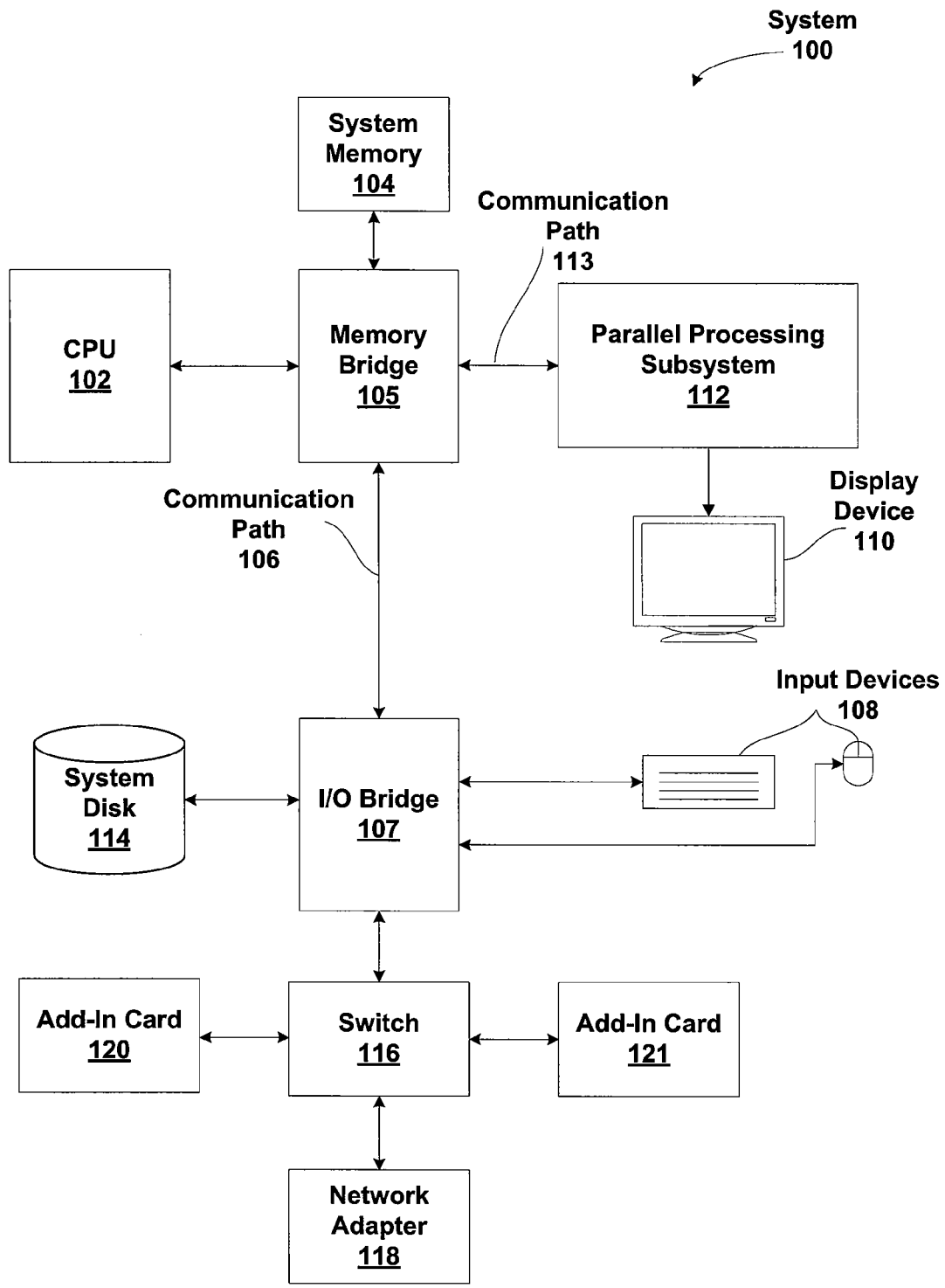
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via a bus path that includes a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

Figure 2:
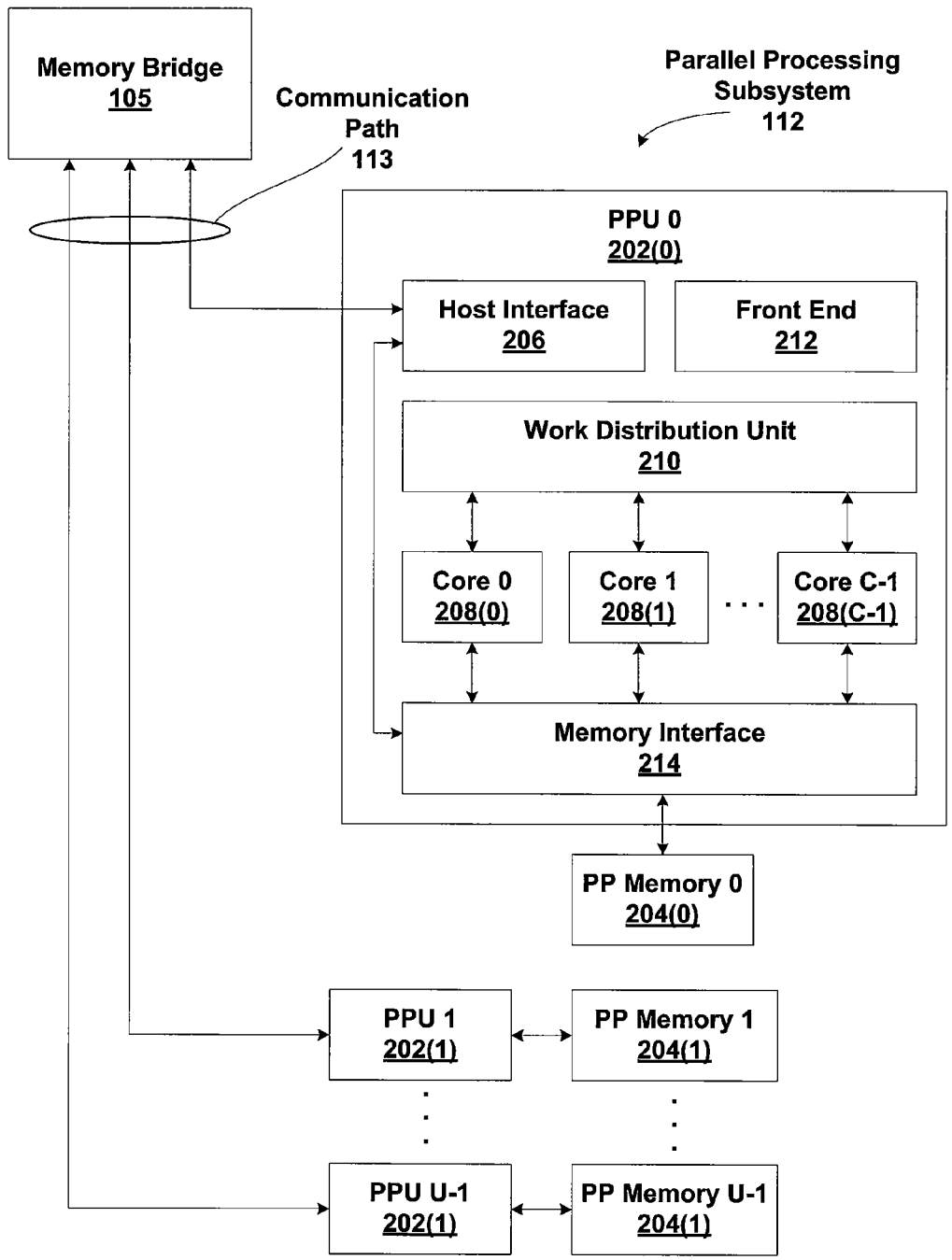
FIG. 2 illustrates a parallel processing subsystem, according to one embodiment of the invention.

FIG. 2 illustrates a parallel processing subsystem 112, according to one embodiment of the invention. Parallel processing subsystem 112 includes one or more parallel processing units (PPUs) 202, each of which is coupled to a local parallel processing (PP) memory 204. In general, a parallel processing subsystem includes a number U of PPUs, where U≥1. (Herein, multiple instances of like objects are denoted with reference numbers identifying the object and parenthetical numbers identifying the instance where needed.) PPUs 202 and PP memories 204 may be implemented, e.g., using one or more integrated circuit devices such as programmable processors, application specific integrated circuits (ASICs), and memory devices. As shown in detail for PPU 202(0), each PPU 202 includes a host interface 206 that communicates with the rest of system 100 via communication path 113, which connects to memory bridge 105 (or, in one alternative embodiment, directly to CPU 102). In one embodiment, communication path 113 is a PCI-E link, in which dedicated lanes are allocated to each PPU 202 as is known in the art. Other communication paths may also be used. Host interface 206 generates packets (or other signals) for transmission on communication path 113 and also receives all incoming packets (or other signals) from communication path 113 and directs them to appropriate components of PPU 202. For example, commands related to processing tasks may be directed to a front end unit 212 while commands related to memory operations (e.g., reading from or writing to PP memory 204) may be directed to a memory interface 214. Host interface 206, front end unit 212, and memory interface 214 may be of generally conventional design, and a detailed description is omitted as not being critical to the present invention.

Each PPU 202 advantageously implements a highly parallel processor. As shown in detail for PPU 202(0), a PPU 202 includes a number C of cores 208, where C≥1. Each processing core 208 is capable of executing a large number (e.g., tens or hundreds) of threads concurrently, where each thread is an instance of a program; one embodiment of a multithreaded processing core 208 is described below. Cores 208 receive processing tasks to be executed via a work distribution unit 210, which receives commands defining processing tasks from a front end unit 212. Work distribution unit 210 can implement a variety of algorithms for distributing work. For instance, in one embodiment, work distribution unit 210 receives a "ready" signal from each core 208 indicating whether that core has sufficient resources to accept a new processing task. When a new processing task arrives, work distribution unit 210 assigns the task to a core 208 that is asserting the ready signal; if no core 208 is asserting the ready signal, work distribution unit 210 holds the new processing task until a ready signal is asserted by a core 208. Those skilled in the art will recognize that other algorithms may also be used and that the particular manner in which work distribution unit 210 distributes incoming processing tasks is not critical to the present invention.

Cores 208 communicate with memory interface 214 to read from or write to various external memory devices. In one embodiment, memory interface 214 includes an interface adapted to communicate with local PP memory 204, as well as a connection to host interface 206, thereby enabling the cores to communicate with system memory 104 or other memory that is not local to PPU 202. Memory interface 214 can be of generally conventional design, and a detailed description is omitted.

Cores 208 can be programmed to execute processing tasks relating to a wide variety of applications, including but not limited to linear and nonlinear data transforms, filtering of video and/or audio data, modeling operations (e.g., applying laws of physics to determine position, velocity and other attributes of objects), image rendering operations (e.g., vertex shader, geometry shader, and/or pixel shader programs), and so on. PPUs 202 may transfer data from system memory 104 and/or local PP memories 204 into internal (on-chip) memory, process the data, and write result data back to system memory 104 and/or local PP memories 204, where such data can be accessed by other system components, including, e.g., CPU 102 or another parallel processing subsystem 112.

Referring again to FIG. 1, in some embodiments, some or all of PPUs 202 in parallel processing subsystem 112 are graphics processors with rendering pipelines that can be configured to perform various tasks related to generating pixel data from graphics data supplied by CPU 102 and/or system memory 104 via memory bridge 105 and bus 113, interacting with local PP memory 204 (which can be used as graphics memory including, e.g., a conventional frame buffer) to store and update pixel data, delivering pixel data to display device 110, and the like. In some embodiments, PP subsystem 112 may include one or more PPUs 202 that operate as graphics processors and one or more other PPUs 202 that are used for general-purpose computations. The PPUs may be identical or different, and each PPU may have its own dedicated PP memory device(s) or no dedicated PP memory device(s).

In operation, CPU 102 is the master processor of system 100, controlling and coordinating operations of other system components. In particular, CPU 102 issues commands that control the operation of PPUs 202. In some embodiments, CPU 102 writes a stream of commands for each PPU 202 to a pushbuffer (not explicitly shown in FIG. 1), which may be located in system memory 104, PP memory 204, or another storage location accessible to both CPU 102 and PPU 202. PPU 202 reads the command stream from the pushbuffer and executes commands asynchronously with operation of CPU 102.

It will be appreciated that the system shown herein is illustrative and that variations and modifications are possible. The connection topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

The connection of PPU 202 to the rest of system 100 may also be varied. In some embodiments, PP system 112 is implemented as an add-in card that can be inserted into an expansion slot of system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

A PPU may be provided with any amount of local PP memory, including no local memory, and may use local memory and system memory in any combination. For instance, a PPU 202 can be a graphics processor in a unified memory architecture (UMA) embodiment; in such embodiments, little or no dedicated graphics (PP) memory is provided, and PPU 202 would use system memory exclusively or almost exclusively. In UMA embodiments, a PPU may be integrated into a bridge chip or processor chip or provided as a discrete chip with a high-speed link (e.g., PCI-E) connecting the PPU to system memory, e.g., via a bridge chip.

As noted above, any number of PPUs can be included in a parallel processing subsystem. For instance, multiple PPUs can be provided on a single add-in card, or multiple add-in cards can be connected to communication path 113, or one or more of the PPUs could be integrated into a bridge chip. The PPUs in a multi-PPU system may be identical to or different from each other; for instance, different PPUs might have different numbers of cores, different amounts of local PP memory, and so on. Where multiple PPUs are present, they may be operated in parallel to process data at higher throughput than is possible with a single PPU.

Systems incorporating one or more PPUs may be implemented in a variety of configurations and form factors, including desktop, laptop, or handheld personal computers, servers, workstations, game consoles, embedded systems, and so on.

Core Overview

Figure 3:
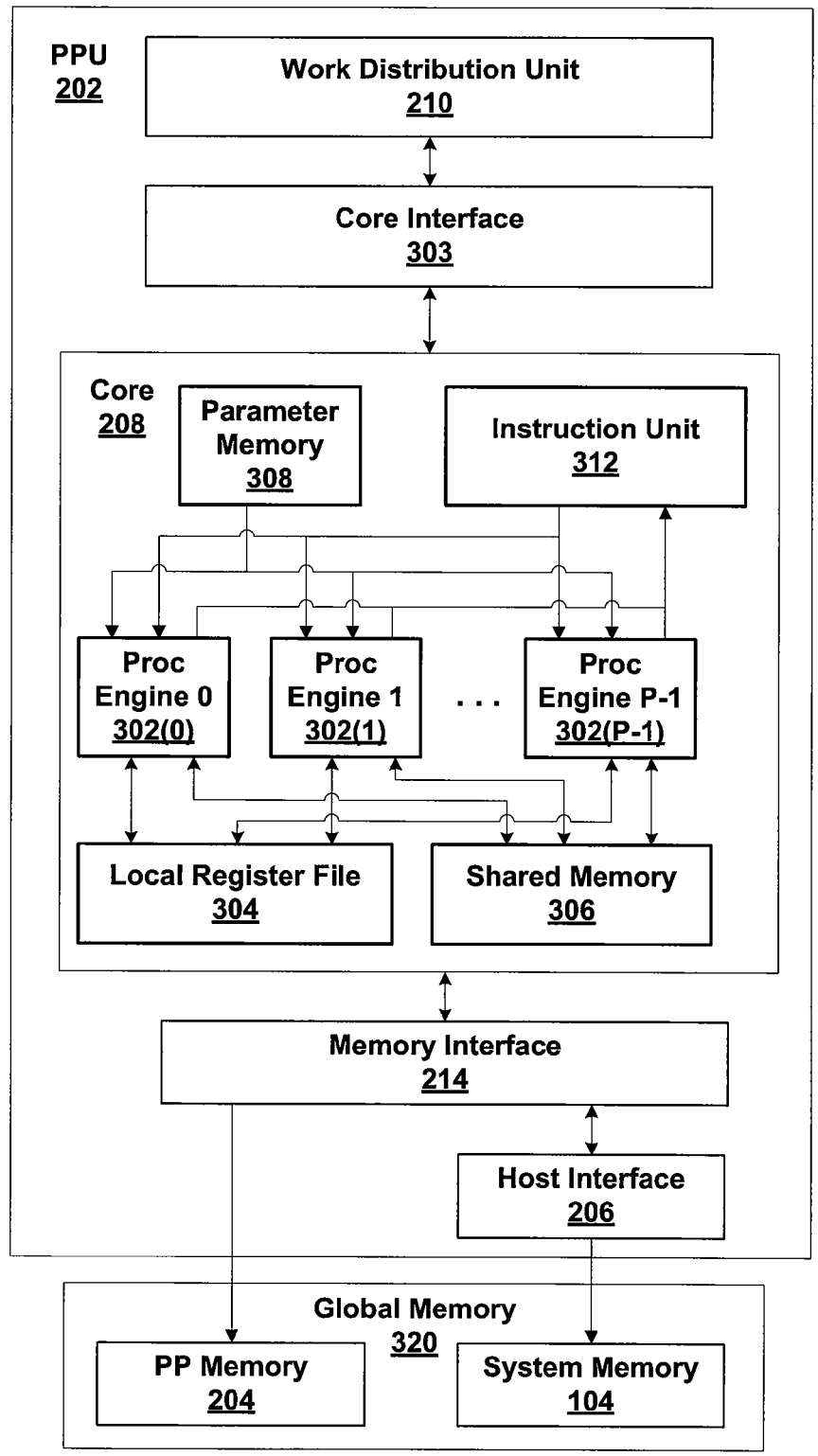
FIG. 3 is a block diagram of a parallel processing unit for the parallel processing subsystem of FIG. 2, in accordance with one or more aspects of the present invention.

FIG. 3 is a block diagram of a parallel processing unit 220 for the parallel processing subsystem 112 of FIG. 2, in accordance with one or more aspects of the present invention. PPU 202 includes a core 208 (or multiple cores 208) configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units.

As is well known, a SIMD core 208 executes a single instruction on different data across a plurality of parallel processing engines 302 included in the core 208. Thus, for example, the core 208 is configured to execute a series of common instructions on the parallel processing engines 302 within the core 208. The series of instructions to a single parallel processing engine 302 constitutes a thread, as defined previously, and the collection of a certain number of concurrently executing threads among the parallel processing engines 302 within a core 208 is referred to herein as a "thread group." Additionally, a plurality of thread groups may be active (in different phases of execution) at the same time on a core 208. This collection of thread groups is referred to herein as a "cooperative thread array" ("CTA").

The size of a particular CTA is equal to m*k, where k is the number of concurrently executing threads in a thread group and is also an integer multiple of the number of parallel processing engines 302 in a core 208, and m is the number of thread groups simultaneously active on the core 208. The size of a CTA is generally determined by the amount of hardware resources, such as memory or registers, available to the CTA.

In one embodiment, each core 208 includes an array of P (e.g., 8, 16, etc.) parallel processing engines 302 configured to receive SIMD instructions from a single instruction unit 312. Each processing engine 302 advantageously includes an identical set of functional units (e.g., arithmetic logic units, etc.). The functional units may be pipelined, allowing a new instruction to be issued before a previous instruction has finished, as is known in the art. Any combination of functional units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

Each processing engine 302 uses space in a local register file (LRF) 304 for storing its local input data, intermediate results, and the like. In one embodiment, local register file 304 is physically or logically divided into P lanes, each having some number of entries (where each entry might store, e.g., a 32-bit word). One lane is assigned to each processing engine 302, and corresponding entries in different lanes can be populated with data for different threads executing the same program to facilitate SIMD execution. In some embodiments, each processing engine 302 can only access LRF entries in the lane assigned to it. The total number of entries in local register file 304 is advantageously large enough to support multiple concurrent threads per processing engine 302.

Each processing engine 302 also has access to an on-chip shared memory 306 that is shared among all of the processing engines 302 in core 208. Shared memory 306 may be as large as desired, and in some embodiments, any processing engine 302 can read to or write from any location in shared memory 306 with equally low latency (e.g., comparable to accessing local register file 304). In some embodiments, shared memory 306 is implemented as a shared register file; in other embodiments, shared memory 306 can be implemented using shared cache memory.

In addition to shared memory 306, some embodiments also provide additional on-chip parameter memory and/or cache(s) 308, which may be implemented, e.g., as a conventional RAM or cache. Parameter memory/cache 308 can be used, e.g., to hold state parameters and/or other data (e.g., various constants) that may be needed by multiple threads. Processing engines 302 also have access via memory interface 214 to off-chip "global" memory 320, which can include, e.g., PP memory 204 and/or system memory 104, with system memory 104 being accessible by memory interface 214 via host interface 206 as described above. It is to be understood that any memory external to PPU 202 may be used as global memory 320. Processing engines 302 can be coupled to memory interface 214 via an interconnect (not explicitly shown) that allows any processing engine 302 to access global memory 320.

In one embodiment, each processing engine 302 is multithreaded and can execute up to some number G (e.g., 24) of threads concurrently, e.g., by maintaining current state information associated with each thread in a different portion of its assigned lane in local register file 304. Processing engines 302 are advantageously designed to switch rapidly from one thread to another so that instructions from different threads can be issued in any sequence without loss of efficiency.

Instruction unit 312 is configured such that, for any given processing cycle, the same instruction (INSTR) is issued to all P processing engines 302. Thus, at the level of a single clock cycle, core 208 implements a P-way SIMD microarchitecture. Since each processing engine 302 is also multithreaded, supporting up to G threads concurrently, core 208 in this embodiment can have up to P*G threads executing concurrently. For instance, if P=16 and G=24, then core 208 supports up to 384 concurrent threads.

Because instruction unit 312 issues the same instruction to all P processing engines 302 in parallel, core 208 is advantageously used to process threads in "SIMD thread groups." As used herein, a "SIMD thread group" refers to a group of up to P threads of execution of the same program on different input data, with one thread of the group being assigned to each processing engine 302. A SIMD thread group may include fewer than P threads, in which case some of processing engines 302 will be idle during cycles when that SIMD thread group is being processed. A SIMD thread group may also include more than P threads, in which case processing will take place over consecutive clock cycles. Since each processing engine 302 can support up to G threads concurrently, it follows that up to G SIMD thread groups can be executing in core 208 at any given time.

On each clock cycle, one instruction is issued to all P threads making up a selected one of the G SIMD thread groups. To indicate which thread is currently active, an "active mask" for the associated thread may be included with the instruction. Processing engine 302 uses the active mask as a context identifier, e.g., to determine which portion of its assigned lane in local register file 304 should be used when executing the instruction. Thus, in a given cycle, all processing engines 302 in core 208 are nominally executing the same instruction for different threads in the same SIMD thread group. (In some instances, some threads in a SIMD thread group may be temporarily idle, e.g., due to conditional or predicated instructions, divergence at branches in the program, or the like.)

Operation of core 208 is advantageously controlled via a core interface 303. In some embodiments, core interface 303 receives data to be processed (e.g., primitive data, vertex data, and/or pixel data) as well as state parameters and commands defining how the data is to be processed (e.g., what program is to be executed) from work distribution unit 210. Core interface 303 can load data to be processed into shared memory 306 and parameters into parameter memory 308. Core interface 303 also initializes each new thread or SIMD thread group in instruction unit 312, then signals instruction unit 312 to begin executing the threads. When execution of a thread or SIMD thread group is completed, core 208 advantageously notifies core interface 303. Core interface 303 can then initiate other processes, e.g., to retrieve output data from shared memory 306 and/or to prepare core 208 for execution of additional threads or SIMD thread groups.

It will be appreciated that the core architecture described herein is illustrative and that variations and modifications are possible. Any number of processing engines may be included. In some embodiments, each processing engine has its own local register file, and the allocation of local register file entries per thread can be fixed or configurable as desired. Further, while only one core 208 is shown, a PPU 202 may include any number of cores 208, which are advantageously of identical design to each other so that execution behavior does not depend on which core 208 receives a particular processing task. Each core 208 advantageously operates independently of other cores 208 and has its own processing engines, shared memory, and so on.

Thread Groups and Cooperative Thread Arrays

In some embodiments, multithreaded processing core 208 of FIG. 3 can execute general-purpose computations using thread groups. As described previously, a thread group consists of a number (nO) of threads that concurrently execute the same program on an input data set to produce an output data set. Each thread in the thread group is assigned a unique thread identifier ("thread ID") that is accessible to the thread during its execution. The thread ID controls various aspects of the thread's processing behavior. For instance, a thread ID may be used to determine which portion of the input data set a thread is to process and/or to determine which portion of an output data set a thread is to produce or write.

In some embodiments, the thread groups are arranged as "cooperative thread arrays," or CTAs. Each CTA is a group of threads that concurrently execute the same program (referred to herein as a "CTA program") on an input data set to produce an output data set. In a CTA, the threads can cooperate by sharing data with each other in a manner that depends on thread ID. For instance, in a CTA, data can be produced by one thread and consumed by another. In some embodiments, synchronization instructions can be inserted into the CTA program code at points where data is to be shared to ensure that the data has actually been produced by the producing thread before the consuming thread attempts to access it. The extent, if any, of data sharing among threads of a CTA is determined by the CTA program; thus, it is to be understood that in a particular application that uses CTAs, the threads of a CTA might or might not actually share data with each other, depending on the CTA program.

In some embodiments, threads in a CTA share input data and/or intermediate results with other threads in the same CTA using shared memory 306 of FIG. 3. For example, a CTA program might include an instruction to compute an address in shared memory 306 to which particular data is to be written, with the address being a function of thread ID. Each thread computes the function using its own thread ID and writes to the corresponding location. The address function is advantageously defined such that different threads write to different locations; as long as the function is deterministic, the location written to by any thread is predictable. The CTA program can also include an instruction to compute an address in shared memory 306 from which data is to be read, with the address being a function of thread ID. By defining suitable functions and providing synchronization techniques, data can be written to a given location in shared memory 306 by one thread of a CTA and read from that location by a different thread of the same CTA in a predictable manner. Consequently, any desired pattern of data sharing among threads can be supported, and any thread in a CTA can share data with any other thread in the same CTA.

CTAs (or other types of thread groups) are advantageously employed to perform computations that lend themselves to a data-parallel decomposition. As used herein, a "data-parallel decomposition" includes any situation in which a computational problem is solved by executing the same algorithm multiple times in parallel on input data to generate output data; for instance, one common instance of data-parallel decomposition involves applying the same processing algorithm to different portions of an input data set in order to generate different portions an output data set. Examples of problems amenable to data-parallel decomposition include matrix algebra, linear and/or nonlinear transforms in any number of dimensions (e.g., Fast Fourier Transforms), and various filtering algorithms including convolution filters in any number of dimensions, separable filters in multiple dimensions, and so on. The processing algorithm to be applied to each portion of the input data set is specified in the CTA program, and each thread in a CTA executes the same CTA program on one portion of the input data set. A CTA program can implement algorithms using a wide range of mathematical and logical operations, and the program can include conditional or branching execution paths and direct and/or indirect memory access.

For example, as is known in the art, an array of data values (e.g., pixels) can be filtered using a 2-D kernel-based filter algorithm, in which the filtered value of each pixel is determined based on the pixel and its neighbors. In some instances the filter is separable and can be implemented by computing a first pass along the rows of the array to produce an intermediate array, then computing a second pass along the columns of the intermediate array. In one CTA implementation of a separable 2-D filter, the threads of the CTA load the input data set (or a portion thereof) into shared memory 306, then synchronize. Each thread performs the row-filter for one point of the data set and writes the intermediate result to shared memory 306. After all threads have written their row-filter results to shared memory 306 and have synchronized at that point, each thread performs the column filter for one point of the data set. In the course of performing the column filter, each thread reads the appropriate row-filter results from shared memory 306, and a thread may read row-filter results that were written by any thread of the CTA. The threads write their column-filter results to shared memory 306. The resulting data array can be stored to global memory or retained in shared memory 306 for further processing. Where shared memory 306 can be accessed with lower latency and/or greater bandwidth than global memory, storing intermediate results in shared memory 306 advantageously improves processor throughput.

In one embodiment, a driver program executing on CPU 102 of FIG. 1 writes commands defining the CTA to a pushbuffer (not explicitly shown) in memory (e.g., system memory 104), from which the commands are read by a PPU 202. The commands advantageously are associated with state parameters such as the number of threads in the CTA, the location in global memory 320 of an input data set to be processed using the CTA, the location in global memory 320 of the CTA program to be executed, and the location in global memory 320 where output data is to be written. The state parameters may be written to the pushbuffer together with the commands. In response to the commands, core interface 303 loads the state parameters into core 208 (e.g., into parameter memory 308), then begins launching threads until the number of threads specified in the CTA parameters have been launched. In one embodiment, core interface 303 assigns thread IDs sequentially to threads as they are launched. More generally, since all threads in a CTA execute the same program in the same core 208, any thread can be assigned any thread ID, as long as each valid thread ID is assigned to only one thread. Any unique identifier (including but not limited to numeric identifiers) can be used as a thread ID. In one embodiment, if a CTA includes some number ($n_0$) of threads, thread IDs are simply sequential (one-dimensional) index values from 0 to $n_0-1$. In other embodiments, multidimensional indexing schemes can be used. It should be noted that as long as data sharing is controlled by reference to thread IDs, the particular assignment of threads to processing engines will not affect the result of the CTA execution. Thus, a CTA program can be independent of the particular hardware on which it is to be executed.

Selective Thread Spawning

Figure 4:
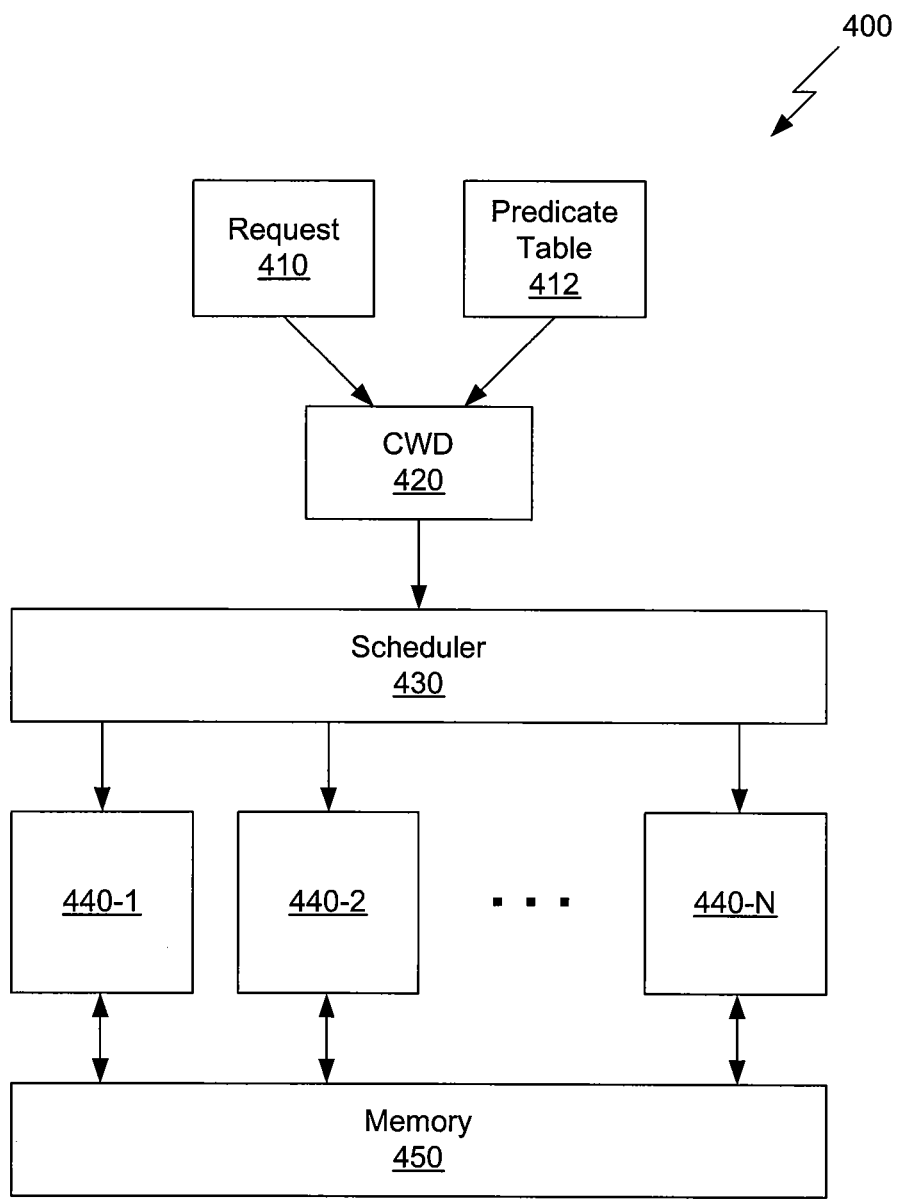
FIG. 4 illustrates a subsystem for spawning threads within a single-instruction multiple-data (SIMD) computation system, according to one embodiment of the invention.

FIG. 4 illustrates a subsystem 400 for spawning threads within a single-instruction multiple-data (SIMD) computation system, according to one embodiment of the invention. The subsystem 400 includes a computation work distributor (CWD) 420, a scheduler 430, thread processors 440, and memory 450.

The CWD 420 receives a request 410 and a predicate table 412 as input. The request 410 includes a reference to a thread program to be executed, and a reference to the predicate table 412, which is used to determine which thread indices should be executed as instances of the thread program. The collection of threads that should be executed is referred to as a thread grid. A thread grid includes, without limitation, one or more thread blocks organized to execute in any technically feasible fashion. Each thread block includes one or more individual threads. In one embodiment, a thread group, described in FIG. 3, implements a thread block, and one or more CTAs implements a thread grid. A requested thread grid is a set of thread blocks, specified by the predicate table 412, to be executed on the thread processors 440. Request 410 also specifies the number of dimensions for the thread grid indices and numeric ranges for each dimension. The CWD 420 generates a list of thread indices to the scheduler 430, which maps the requests onto thread processors 440 for execution. The thread processors 440 are able to access memory 450, a shared memory system, which may include multiple memory storage units.

In one embodiment, the CWD 420 and scheduler 430 are sub-modules within the work distribution unit 210 of FIG. 2, and the thread processors 440 are the processing engines 302 of FIG. 3. Memory 450 includes any memory subsystem within the PPU 202, including local register file 304, shared memory 306 and global memory 320.

Figure 5:
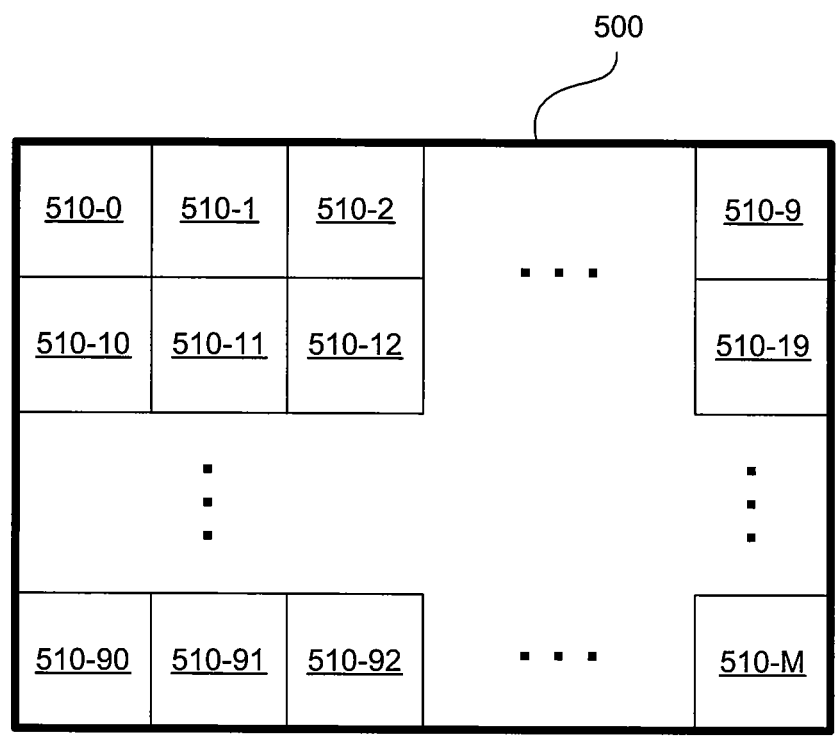
FIG. 5 illustrates a predicate table, according to one embodiment of the invention.

FIG. 5 illustrates a predicate table 500, according to one embodiment of the invention. The predicate table 500 includes entries 510, which correspond to the range of possible indices included in request 410. Each entry 510 includes a flag that indicates if the thread block corresponding to the entry should be spawned in the current computation phase. If the flag of a given index is true, then a corresponding thread block is spawned. If the flag is false, a corresponding thread block does not need to be spawned. Predicate table 500 may be specified to include an arbitrary number of dimensions, and have an arbitrary size in each dimension. In one embodiment, each entry 510 determines if a thread block including one thread should be spawned. In a different embodiment, each entry 510 determines if a thread block of two or more threads should be spawned. When a predicate table 500 is referenced by request 410, then the predicate table 500 corresponds to predicate table 412.

Figure 6:
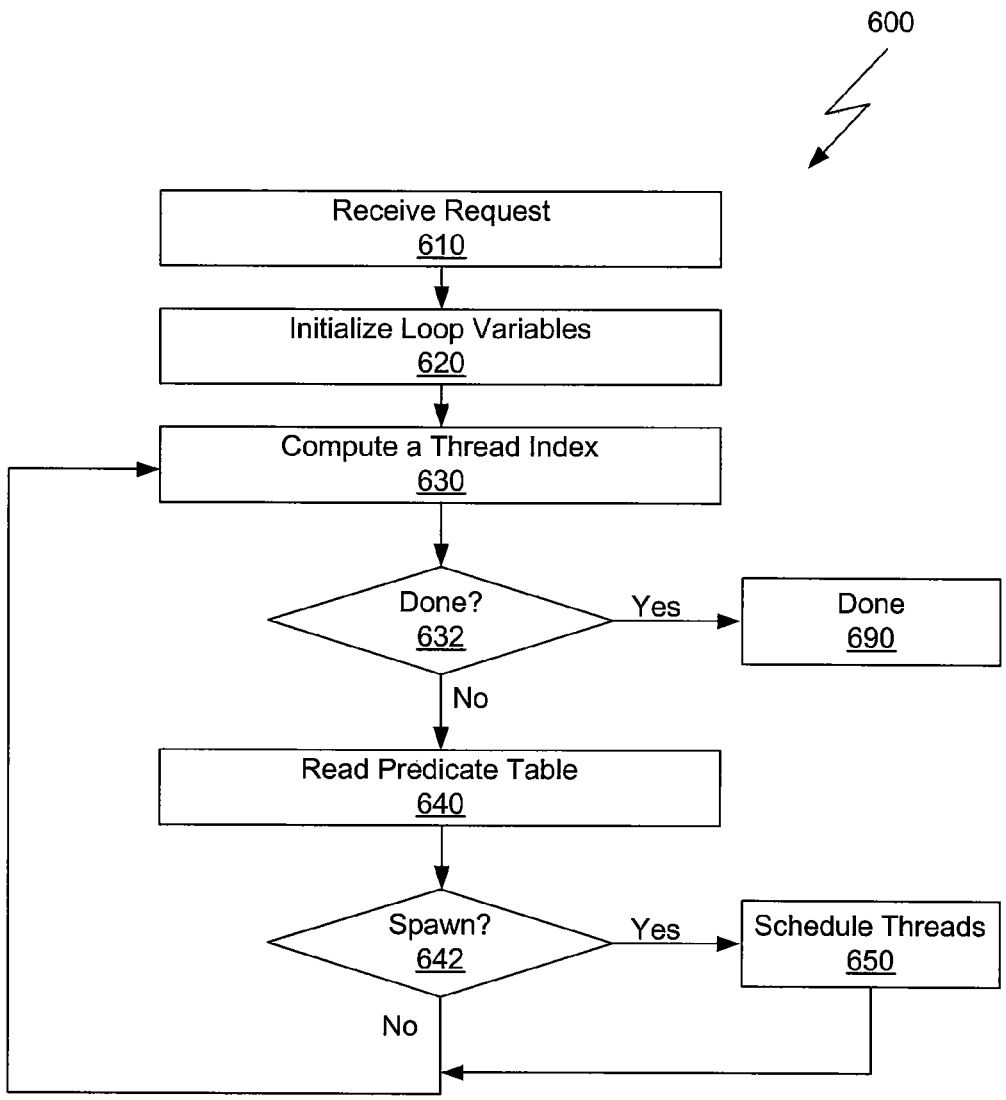
FIG. 6 is a flow diagram of method steps for selectively spawning threads within a SIMD system, according to one embodiment of the invention.

FIG. 6 is a flow diagram of method steps 600 for selectively spawning threads within a SIMD system, according to one embodiment of the invention. Although the method steps are described in conjunction with the systems of FIGS. 1, 2, 3 and 4, persons skilled in the art will understand that any system that performs the method steps, in any order, is within the scope of the invention. The method may be performed directly in hardware using logic gates, micro-code, or any other technically feasible technique and may employ any appropriate execution optimization technique.

The method begins in step 610, where the CWD 420 receives a request 410, including a reference to predicate table 412. In step 620, the CWD 420 initializes one or more loop variables for computing thread indices. If the requested thread grid is one dimensional, then one loop variable is used. If the requested thread grid is two-dimensional, then two loop variables are used, and so forth.

In step 630, the CWD 420 computes a thread index using the one or more loop variables. For example, if a two-dimensional thread block is requested, then loop variables "x" and "y" may each be initialized to "0." In the first pass, "x" is computed in step 630 to be zero; in the next pass, "x" is computed as one, and so forth. Similarly, "y" is initially computed to be zero in the first pass, and is incremented each time "x" increments through the range specified in request 410. The result is a set of "x" and "y" pairs that cover the range of "x" and "y" specified in request 410. When all of the index combinations have been elaborated, then the process may complete, and a "done" state is computed.

If, in step 632, the done state is computed, then the method terminates in step 690. If, in step 632, the done state is not computed, then the method proceeds to step 640, where the CWD 420 reads predicate table 412 using the current loop variables to select a corresponding entry. If, in step 642, the entry read from predicate table 412 indicates that the corresponding thread block should be spawned, then the method proceeds to step 650, where the CWD 420 schedules the thread block for execution. In one embodiment, each thread block is individually scheduled. In an alternate embodiment, sets of two or more thread blocks are scheduled at a time. The method then returns to step 630.

Returning to step 642, if the entry from the predicate table 412 indicates that the corresponding thread index should not be spawn, then the method proceeds to step 630.

Dynamic Thread Spawning

Certain thread applications require varying degrees of system resources and perform varying degrees of computation, based on the outcome of one or more conditional statements that guide execution through a given block of programming instructions out of multiple blocks of programming instructions. By dividing a given thread program into two or more thread sub-programs, which may be spawned separately, certain efficiencies may be achieved. Predicate tables may be used to selectively spawn thread sub-programs by passing conditional statement results from a predecessor sub-program to a dependent sub-program.

Figure 7:
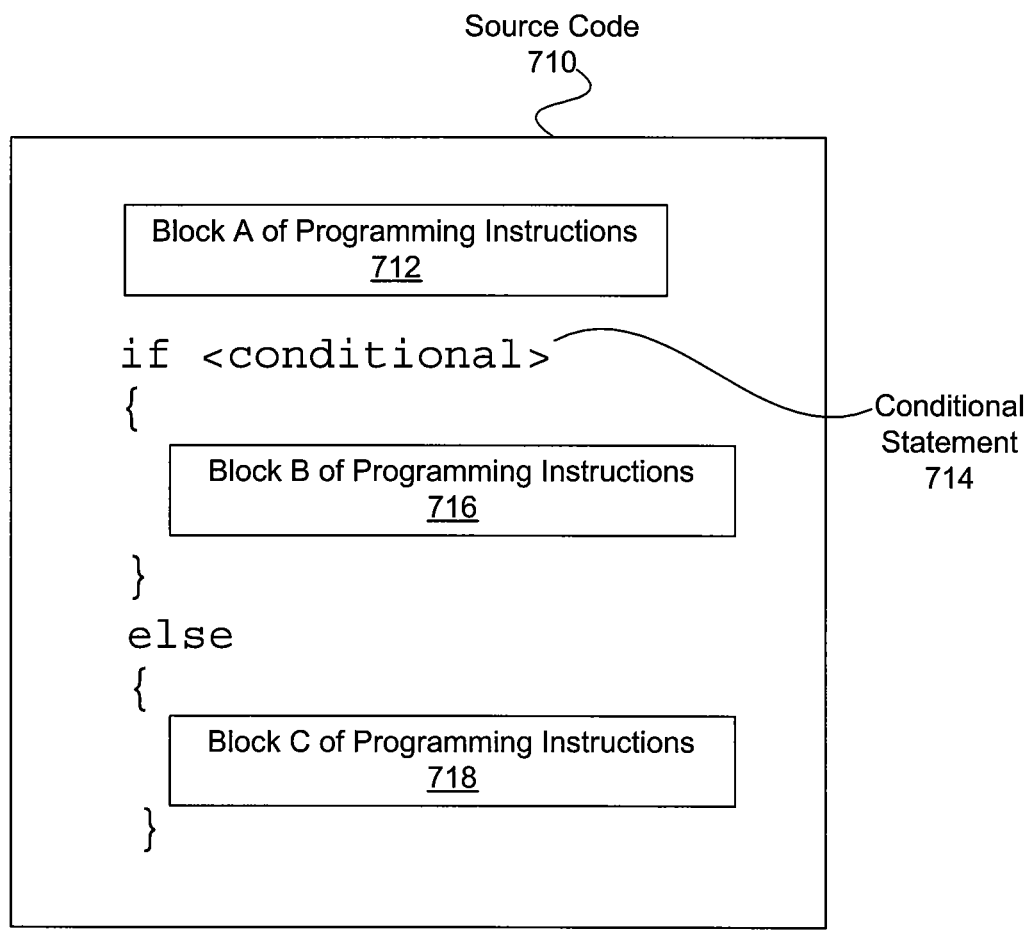
FIG. 7 depicts a portion of source code, including three blocks of programming instructions and a conditional statement, according to one embodiment of the invention.

FIG. 7 depicts a portion of source code 710, including three blocks of programming instructions 712, 716, 718 and a conditional statement 714, according to one embodiment of the invention. Block A of programming instructions 712 may execute initially, establishing any state needed to perform a conditional statement 714, which then guides the program execution to either block B of programming instructions 716 or to block C of programming instructions 718.

In a conventional execution model, the conditional statement 714 guides execution within a single executing program image to either block B of programming instructions 716 or to block C of programming instructions 718 using a branching means, such as a "branch" or "jump" instruction. In such a conventional approach, all system resources needed to execute both blocks of programming instructions must be allocated prior to the start of execution. In certain embodiments of the invention, the state of the conditional statement is evaluated, but the branching aspect of the conditional statement is replaced with a write or update operation to one or more predicate tables. For example, if the computed state of the conditional statement 714 indicates that block B of programming instructions 716 should be executed, then the corresponding thread group entry within the predicate table associated with block B of programming instructions 716 is written with a "true" or "1." In a subsequent execution phase, a thread sub-program corresponding to block B of programming instructions 716 is spawned, where an instance of thread sub-program is spawned for every predicate table entry marked "1" for execution.

Figure 8:
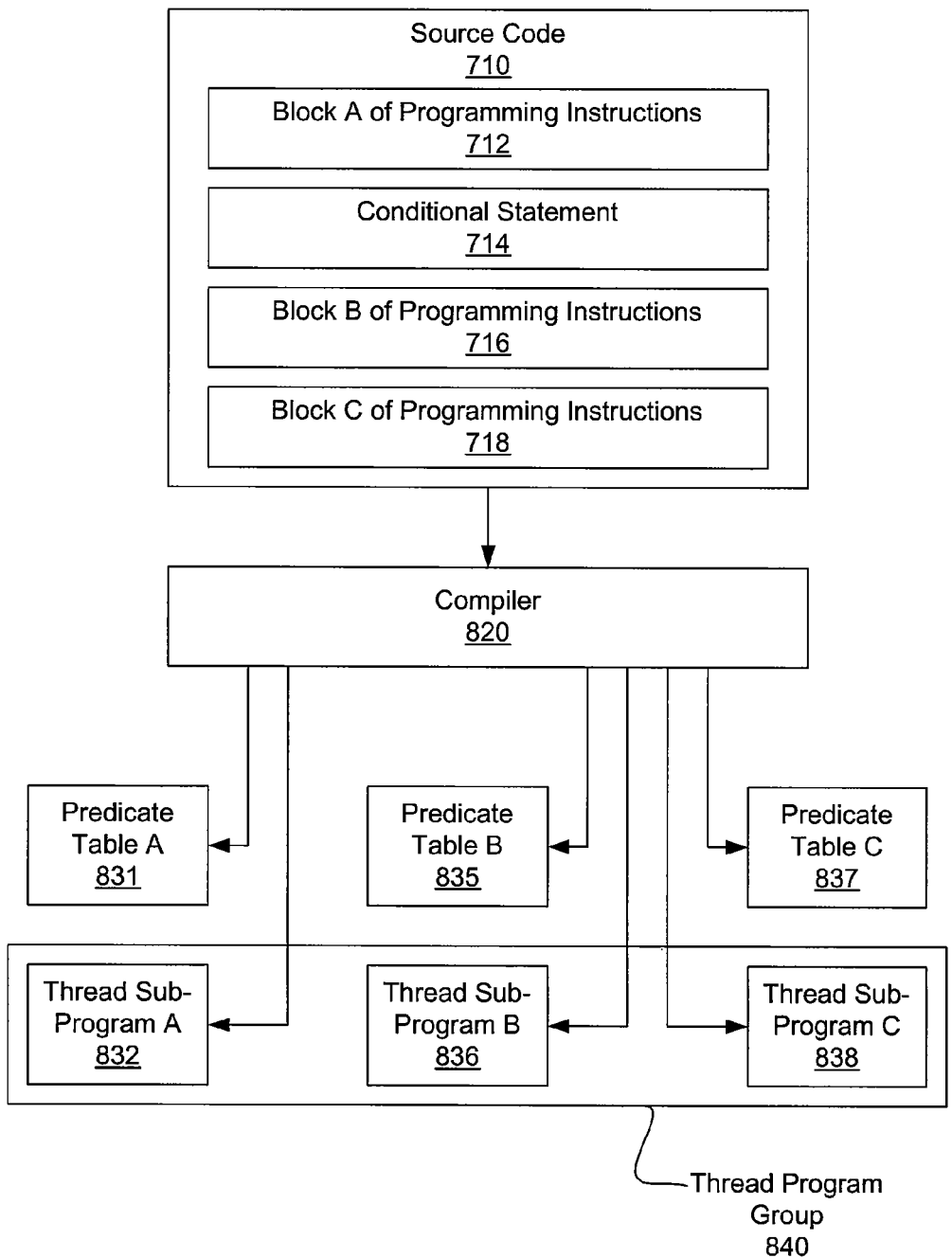
FIG. 8 illustrates a compilation process from source code to a thread program group, according to one embodiment of the invention.

FIG. 8 illustrates a compilation process from source code 710 to a thread program group 840, according to one embodiment of the invention. The source code 710 of FIG. 7 includes block A of programming instructions 712, conditional statement 714, block B of programming instructions 716, and block C of programming instructions 718. A compiler 820 receives source code 710 for compilation. The compiler 820 generates the thread program group 840, which includes thread sub-programs, such as thread sub-program A 832, thread sub-program B 836, thread sub-program C 838.

In one embodiment, the compiler 820 also generates a set of predicate tables 831, 835, 837, which are allocated at compile time. For example, predicate table A 831 defines which possible instances of thread sub-program A 832 should be spawned, and predicate table B 835 defines which possible instances of thread sub-program B 836 should be spawned, and so forth. In an alternate embodiment, the compiler 820 generates a specification for the predicate tables, which are allocated at run-time. In both embodiments, a set of references to each predicate table is maintained by the compiler 820 for use when partitioning source code 710 into thread sub-programs.

The compiler 820 is configured to analyze source code 710 for opportunities to partition the function of source code 710 along boundaries defined by one or more partition indicators, such as conditional statement 714. When the compiler partitions source code 710 along a conditional statement boundary, the compiler generates additional thread sub-programs, corresponding to the different program partitions. In the case where the boundaries are defined by a conditional statement, the thread sub-programs correspond to alternate branches of the conditional statement. Any technically appropriate means of analysis may be employed. In one embodiment, source code 710 is partitioned along conditional statement boundaries when one branch uses substantially more system resources than alternative branches.

Again, the compiler 820 automatically partitions source code 710 along boundaries defined by one or more different partition indicators. In one embodiment, the partition indicators are conditional statements. However, in alternative embodiments, other partition indicator criteria, such as a code size threshold, a data size threshold, or data dependencies may be used by the compiler 820 to automatically determine the thread sub-program boundaries. In each such embodiment, a predicate table is associated with a thread sub-program.

In some embodiments, a thread sub-program may be partitioned explicitly using a compiler directive means as a partition indicator. For example, the compiler may respond to an explicit compiler directive within the source code 710 that instructs the compiler to partition a specified block of programming instructions into a thread sub-program. In one embodiment, a function declaration within source code 710 may include a compiler directive that serves as a partition indicator, serving to instruct the compiler to partition the declared function into a separate thread sub-program.

Figure 9A:
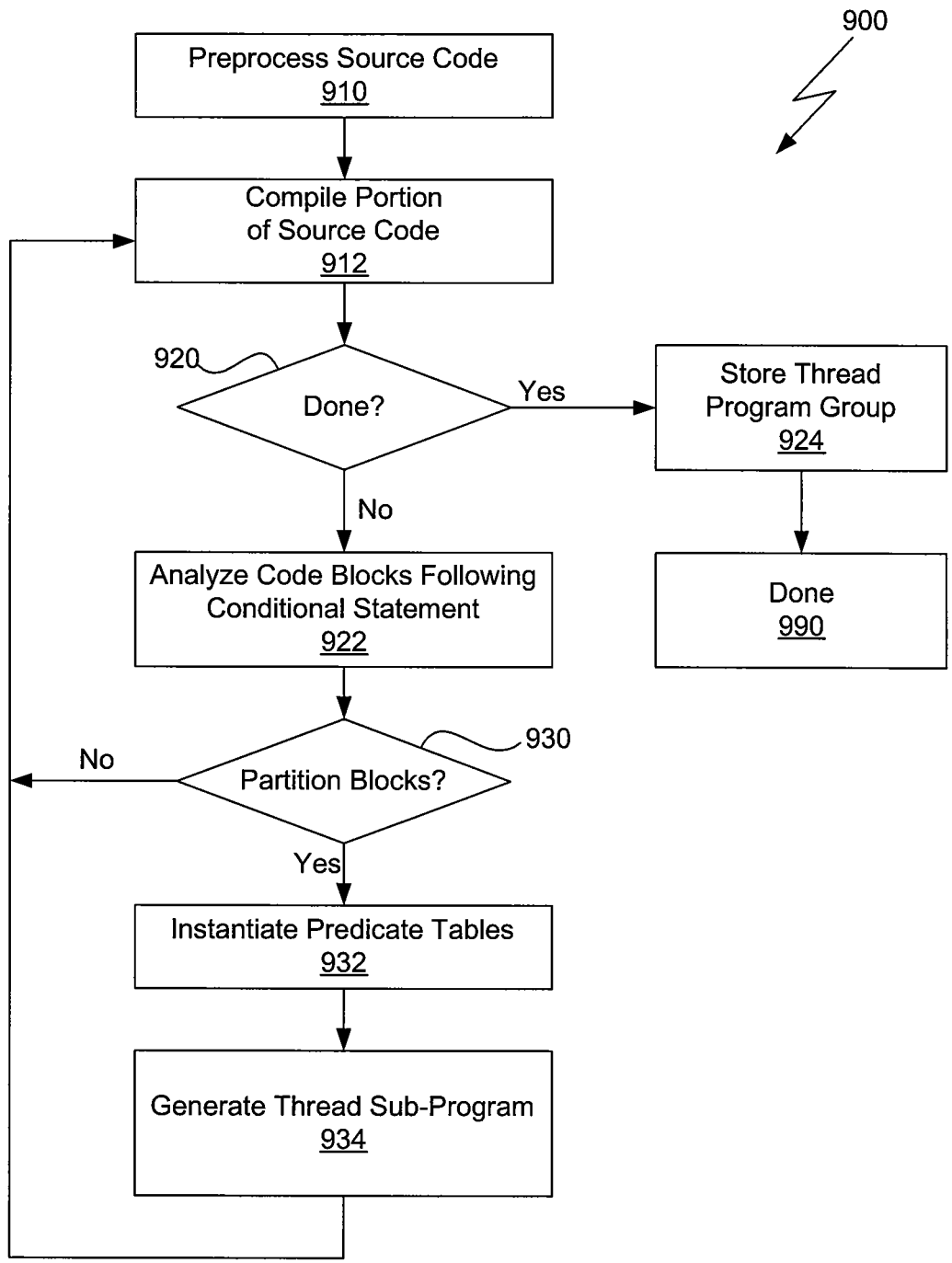
FIG. 9A is a flow diagram of method steps for compiling a thread program into a thread program group, according to one embodiment of the invention.

FIG. 9A is a flow diagram of method steps 900 for compiling a thread program into a thread program group, according to one embodiment of the invention. Although the method steps are described in conjunction with the systems of FIGS. 1, 2, 3, 4 and 8, persons skilled in the art will understand that any system that performs the method steps, in any order, is within the scope of the invention. The method may be performed directly in hardware using logic gates, micro-code, or any other technically feasible technique and may employ any appropriate execution optimization technique.

The method begins in step 910, where a source code preprocessor preprocesses source code, such as source code 710 of FIG. 7. Preprocessing is a well-known compilation step that involves, for example, resolving any embedded statements and macros, and including any header files. In step 912, the compiler 820 compiles a portion of source code 710 until a conditional statement, if any, is found. If, in step 920, the compilation process is completed, then the method proceeds to step 924, where the compiler 820 stores the thread program group for later execution in an appropriate storage subsystem. The method terminates in step 990.

Returning to step 920, if the compilation process is not completed, the method proceeds to step 922, where the compiler 820 analyzes code blocks following the conditional statement for opportunities to partition the source code. If, in step 930, the compiler 820 finds no opportunity to partition blocks in the source code 710, then the method proceeds to step 912.

Returning to step 930, if the compiler 820 finds an opportunity to partition source code 710, then the method proceeds to step 932, where the compiler 820 instantiates predicate tables corresponding to each partitioned block of source code. In one embodiment, the compiler allocates space for the predicate tables at compile time. In an alternate embodiment, the compiler establishes an allocation requirement for the predicate tables to be allocated at run-time.

In step 934, the compiler 820 generates a thread sub-program. The predecessor thread program to each generated thread sub-program is configured to populate the predicate table associated with each of the generated thread sub-programs. For each generated thread sub-program, the associated conditional statement in the predecessor thread program is configured to write a "true" value in the predicate table corresponding to that generated thread sub-program for each thread block that executes the generated thread sub-program. In one embodiment, step 934 may be performed by the method steps described in FIG. 9B. The method then returns to step 912.

Figure 9B:
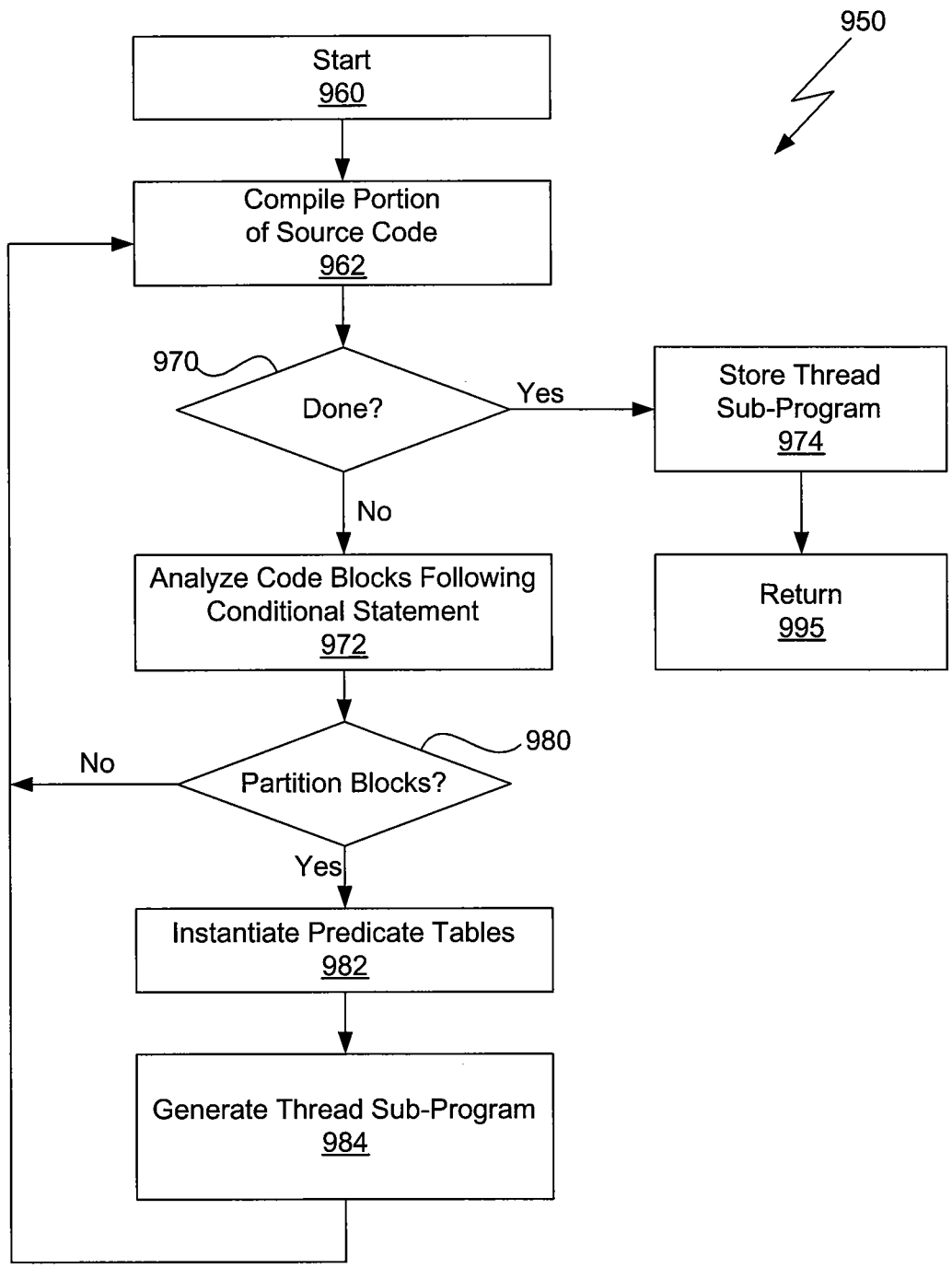
FIG. 9B is a flow diagram of method steps for generating a thread sub-program, according to one embodiment of the invention.

FIG. 9B is a flow diagram of method steps 950 for generating a thread sub-program, according to one embodiment of the invention. Although the method steps are described in conjunction with the systems of FIGS. 1, 2, 3, 4 and 8, persons skilled in the art will understand that any system that performs the method steps, in any order, is within the scope of the invention. The method may be performed directly in hardware using logic gates, micro-code, or any other technically feasible technique and may employ any appropriate execution optimization technique. The method may be executed recursively, whereby multiple instances of the method may be in progress simultaneously.

The method begins in step 960, where a calling function within the compiler 820 starts an instance of the method. In step 962, the compiler 820 compiles a portion of source code 710 until a conditional statement, if any, is found. If, in step 970, the compilation process is completed for the assigned portion of source code 710, then the method proceeds to step 974, where the compiler 820 stores the thread sub-program in an appropriate storage subsystem for later execution. The method returns to the calling function in step 995.

Returning to step 970, if the compilation process is not completed, the method proceeds to step 972, where the compiler 820 analyzes code blocks following the conditional statement for opportunities to partition the source code. If, in step 980, the compiler 820 finds no opportunity to partition blocks in the source code 710, then the method proceeds to step 962.

Returning to step 980, if the compiler 820 finds an opportunity to partition source code 710, then the method proceeds to step 982, where the compiler 820 instantiates predicate tables corresponding to each partitioned block of source code.

In one embodiment, the compiler allocates space for the predicate tables at compile time. In an alternate embodiment, the compiler establishes an allocation requirement for the predicate tables to be allocated at run-time.

In step 984, the compiler 820 generates a thread sub-program. The predecessor thread program to each generated thread sub-program is configured to populate the predicate table associated with each of the generated thread sub-programs. For each generated thread sub-program, the associated conditional statement in the predecessor thread program is configured to write a "true" value in the predicate table corresponding to that generated thread sub-program for each thread block that executes the generated thread sub-program. In one embodiment, step 984 may be performed by recursively invoking the method of FIG. 9B. The method then returns to step 962.

Figure 10:
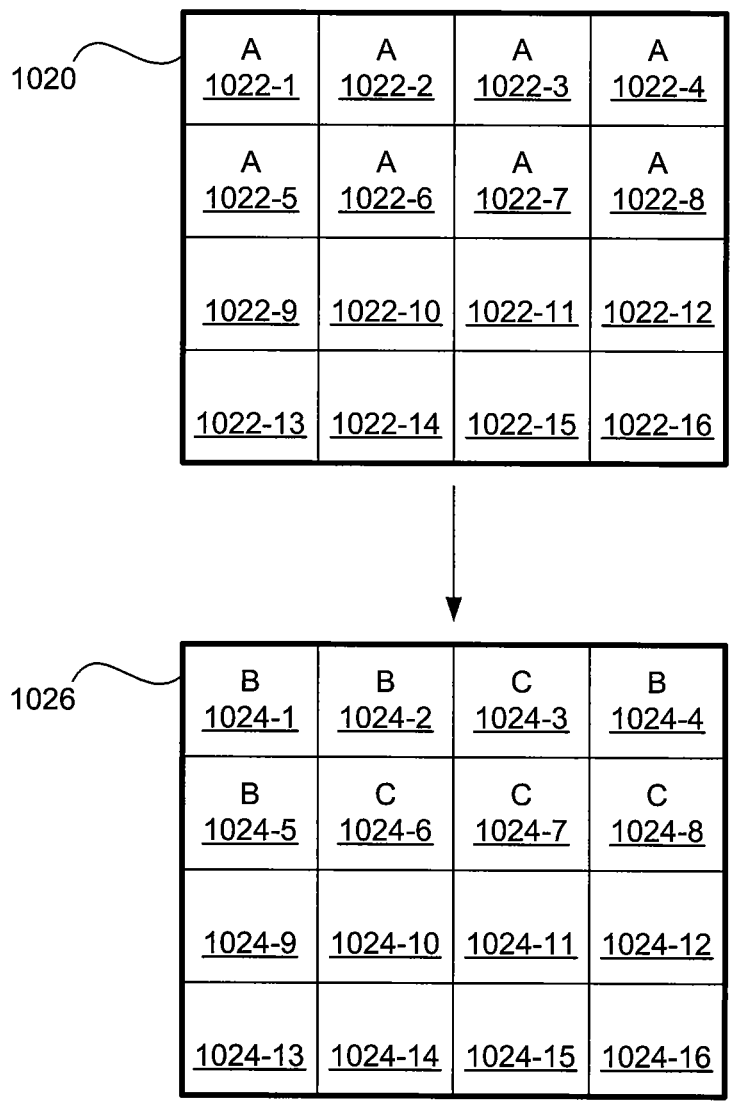
FIG. 10 illustrates the outcome of conditional statements computed within a thread grid, according to one embodiment of the invention.

FIG. 10 illustrates the outcome of conditional statements computed within a thread grid, according to one embodiment of the invention. A first thread grid 1020 of thread groups includes thread group "A" corresponding to a first thread sub-program that is instantiated for execution at indices 1022-1 through 1022-8. Indices 1022-9 through 1022-16 are inactive within the thread grid 1020.

Based on the computed outcome of a conditional statement within the first thread sub-program, either thread sub-program B or thread sub-program C should subsequently execute at the thread grid indices corresponding to thread sub-program A. A second thread grid 1026 illustrates the mix of thread sub-program B and thread sub-program C within the subsequent thread grid of thread sub-programs to be executed. The mix of thread sub-programs indicated by the second thread grid 1026 may be represented as a set of predicate tables, as shown in FIGS. 11A to 11C.

Figure 11A:
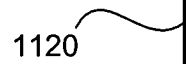
FIG. 11A illustrates a predicate table for a first thread program, where an initial set of entries are set to enabled, according to one embodiment of the invention.

FIG. 11A illustrates a predicate table 1120 for a first thread program, where an initial set of entries are set to enabled, according to one embodiment of the invention. Entries 1120-1 through 1120-8 are initially enabled, reflecting the requirement for thread sub-program A to execute at indices "1" through "8" within the thread grid, as shown in FIG. 10.

FIG. 11B illustrates a predicate table 1122 for a second thread program, where certain entries are set to enabled, according to one embodiment of the invention. Entries 1132 are written by thread sub-program A, according to the computed outcome of a conditional statement within thread sub-program A. In this case thread sub-program A is the predecessor thread program to the second thread sub-program (thread sub-program B). As shown, the outcome of the conditional statement within thread sub-program A is that thread sub-program B should execute at indices "1," "2," "4," and "5," as reflected in FIG. 10.

FIG. 11C illustrates a predicate table 1124 for a third thread program, where a different set of entries are set to enabled, according to one embodiment of the invention. Entries 1134 are written by thread sub-program A, according to the computed outcome of a conditional statement within thread sub-program A. In this case thread sub-program A is the predecessor thread program to the third thread sub-program (thread sub-program C). As shown, the outcome of the conditional statement within thread sub-program A is that thread sub-program C should execute at indices "3," "6," "7," and "8," as reflected in FIG. 10.

Figure 12:
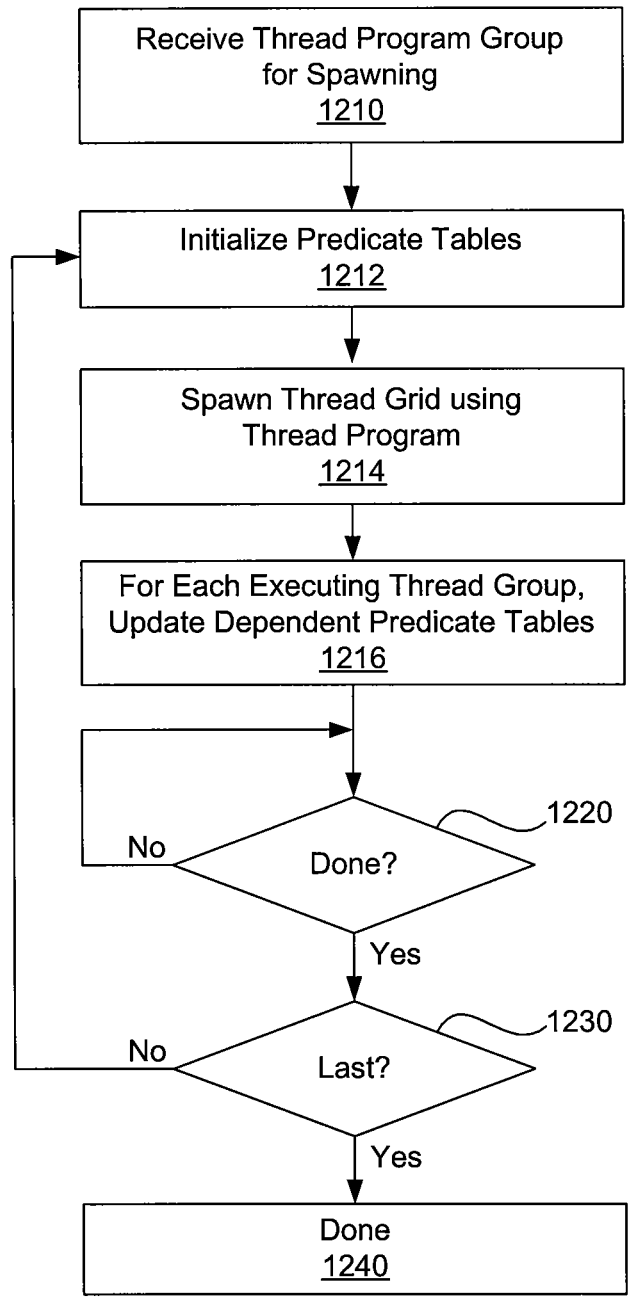
FIG. 12 is a flow diagram of method steps for executing a thread program group on a thread processor, according to one embodiment of the invention.

FIG. 12 is a flow diagram of method steps for executing a thread program group on a thread processor, according to one embodiment of the invention. Although the method steps are described in conjunction with the systems of FIGS. 1, 2, 3, 4 and 8, persons skilled in the art will understand that any system that performs the method steps, in any order, is within the scope of the invention. The method may be performed directly in hardware using logic gates, micro-code, or any other technically feasible technique and may employ any appropriate execution optimization technique.

The method begins in step 1210, where a thread run-time manager receives a thread program group for spawning. The thread group program may be compiled using the method steps taught in FIG. 9A. The run-time manager may be any technically appropriate subsystem capable of spawning a thread grid of thread groups. In one embodiment the run-time manager resides within a device driver, such as a GPU driver. In step 1212, the run-time manager initializes one or more predicated tables. In an alternate embodiment, a selected thread initializes the one or more predicate tables. In step 1214, the run-time manager calls the CWD 420 of FIG. 4 with a request to spawn a thread grid to execute one of the thread programs included in the thread program group using the predicate table associated with that thread program.

In step 1216, for each executing thread group, any dependant predicate tables (predicate tables used in a subsequent spawning phase) are populated by the executing thread groups. Specifically, each thread group writes a "true" value in the predicate table corresponding to each thread sub-program generated from the current thread program to the extent the thread group executes that thread sub-program. If, in step 1220, the thread groups within the spawned thread grid are not done executing, then the method proceeds back to step 1220.

Returning to step 1220, if the thread groups within the spawned thread grid are done executing, then the method proceeds to step 1230. If, in step 1230, the last thread sub-program associated with the current thread program group is not done executing, then the method returns to step 1212.

Returning to step 1230, if the last thread sub-program associated with the current thread program group is done executing, then the method terminates in step 1240.

In sum, a system and method for compiling a thread program into multiple thread sub-programs is disclosed. A compiler suitable for compiling thread programs is configured to analyze input programs at conditional statements to determine if the original thread program should be partitioned into multiple thread sub-programs. If a determination is made to partition the thread program into multiple thread sub-programs, then the compiler generates multiple thread sub-programs, each corresponding to a portion of the code executing before a conditional and at each branch of the conditional statement.

At run-time, a thread sub-program populates predicate tables corresponding to conditional statement computations within the thread sub-program. Each subsequent thread sub-program corresponds to one branch in a conditional statement residing in a predecessor thread program and executes only if the conditional branch needs to execute.

While the forgoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention. Therefore, the scope of the present invention is determined by the claims that follow.

We claim:

1. A method for compiling a thread program to support dynamic thread spawning, the method comprising:
compiling a first portion of a source code into a first thread program associated with a first predicate table;
identifying a partition indicator within the first portion of the source code;
partitioning a second portion of the source code following the partition indicator into a code block;
instantiating a second predicate table for the code block to indicate which thread blocks in a thread grid are to execute the code block; and
compiling the second portion of the source code into a second thread program configured to populate the second predicate table,
wherein, during execution of particular thread programs, thread blocks in the thread grid are spawned as indicated by the predicate tables corresponding to the particular thread programs, and
wherein the partition indicator comprises a conditional statement that, when executed as part of the first thread program, is configured to write a true value in the second predicate table for each thread block in the thread grid that is to execute the second thread program.

2. The method of claim 1, wherein the step of instantiating comprises allocating space for the second predicate table at compile time.

3. The method of claim 1, wherein the step of instantiating comprises establishing an allocation requirement for the second predicate table at run time.

4. The method of claim 1, further comprising partitioning a third portion of the source code following the code block into a second code block.

5. The method of claim 4, further comprising instantiating a third predicate table for the second code block to indicate which thread blocks in the thread grid are to execute the second code block.

6. The method of claim 5, further comprising compiling the third portion of the source code into a third thread program associated with the third predicate table.

7. The method of claim 6, wherein the partition indicator comprises a conditional statement, and wherein the first thread program is configured to populate the second predicate table and the third predicate table based on execution of the conditional statement.

8. The method of claim 7, further comprising the step of storing the first thread program, the second thread program and the third thread program as a thread program group for later execution.

9. A non-transitory computer-readable medium including instructions that, when executed by a processing unit, cause the processing unit to compile a thread program to support dynamic thread spawning, by performing the steps of:
compiling a first portion of a source code into a first thread program associated with a first predicate table;
identifying a partition indicator within the first portion of the source code;
partitioning a second portion of the source code following the partition indicator into a code block;
instantiating a second predicate table for the code block to indicate which thread blocks in a thread grid are to execute the code block; and
compiling the second portion of the source code into a second thread program configured to populate the second predicate table,
wherein, during execution of particular thread programs, zero or more thread blocks in the thread grid are spawned as indicated by the predicate tables corresponding to the particular thread programs, and
wherein the partition indicator comprises a conditional statement that, when executed as part of the first thread program, is configured to write a true value in the second predicate table for each thread block in the thread grid that is to execute the second thread program.

10. The computer-readable medium of claim 9, wherein the step of instantiating comprises allocating space for the second predicate table at compile time.

11. The computer-readable medium of claim 10, wherein the step of instantiating comprises establishing an allocation requirement for the second predicate table at run time.

12. The computer-readable medium of claim 9, wherein the first thread program is configured to populate the second predicate table.

13. The computer-readable medium of claim 9, the steps further comprising partitioning a third portion of the source code following the code block into a second code block.

14. The computer-readable medium of claim 13, the steps further comprising instantiating a third predicate table for the second code block to indicate which thread blocks in the thread grid are to execute the second code block.

15. The computer-readable medium of claim 14, the steps further comprising compiling the third portion of the source code into a third thread program associated with the third predicate table.

16. The computer-readable medium of claim 14, wherein the partition indicator comprises a conditional statement, and wherein the first thread program is configured to populate the second predicate table and the third predicate table.

17. A computing system, comprising:
a parallel processing unit; and
a memory coupled to the parallel processing unit and including a compiler configured to compile a thread program for execution on the parallel processing unit, by performing the steps of:
compiling a first portion of a source code into a first thread program associated with a first predicate table,
identifying a partition indicator within the first portion of the source code,
partitioning a second portion of the source code following the partition indicator into a code block,
instantiating a second predicate table for the code block to indicate which thread blocks in a thread grid are to execute the code block, and
compiling the second portion of the source code into a second thread program configured to populate the second predicate table,
wherein, during execution of particular thread programs by the parallel processing unit, zero or more thread blocks in the thread grid are spawned as indicated by the predicate tables corresponding to the particular thread programs, and wherein the partition indicator comprises a conditional statement that, when executed as part of the first thread program, is configured to write a true value in the second predicate table for each thread block in the thread grid that is to execute the second thread program.

18. The method of claim 1, wherein each thread block in the thread grid includes one or more individual threads.

19. The method of claim 1, wherein the predicate tables indicate which thread blocks in the thread grid execute the particular thread programs.

* * * * *